United States Patent [19]

Lippert et al.

[11] Patent Number: 4,904,287
[45] Date of Patent: Feb. 27, 1990

[54] COMPACT CERAMIC TUBE FILTER ARRAY HIGH-TEMPERATURE GAS FILTRATION

[75] Inventors: Thomas E. Lippert, Marysville, Pa.; David F. Ciliberti, deceased, late of Marysville, Pa., by Paula Ciliberti, executrix

[73] Assignee: Electric Power Research Institute, Palo Alto, Calif.

[21] Appl. No.: 288,698

[22] Filed: Dec. 22, 1988

[51] Int. Cl.$^4$ .............................................. B01D 46/24
[52] U.S. Cl. ..................... 55/302; 55/341.1; 55/523
[58] Field of Search ............... 55/302, 341.1–341.7, 55/523

[56] References Cited

U.S. PATENT DOCUMENTS

| | | | |
|---|---|---|---|
| 2,526,651 | 10/1950 | Garbo | 55/523 X |
| 3,421,295 | 1/1969 | Swift et al. | 55/302 |
| 3,436,898 | 4/1969 | Kaess et al. | 55/523 X |
| 3,608,282 | 9/1971 | Ririe | 55/523 X |
| 3,683,595 | 8/1972 | Houghton et al. | 55/302 |
| 4,342,574 | 8/1982 | Fetzer | 55/350 X |
| 4,343,631 | 8/1982 | Ciliberti | 55/302 |
| 4,398,931 | 8/1983 | Shevlin | 55/302 X |
| 4,509,960 | 4/1985 | Engel | 55/341.7 X |
| 4,525,184 | 6/1985 | Tassicker | 55/302 |
| 4,560,396 | 12/1985 | O'Dell | 55/302 X |
| 4,584,003 | 4/1986 | Oda et al. | 55/341.3 X |
| 4,735,635 | 4/1988 | Israelson et al. | 55/302 X |
| 4,735,638 | 4/1988 | Ciliberti et al. | 55/302 |
| 4,737,176 | 4/1988 | Lippert et al. | 55/523 X |
| 4,764,190 | 8/1988 | Israelson et al. | 55/302 X |
| 4,791,785 | 12/1988 | Hudson et al. | 55/523 X |

FOREIGN PATENT DOCUMENTS

| | | | |
|---|---|---|---|
| 2943093 | 5/1981 | Fed. Rep. of Germany | 55/302 |
| 1289019 | 12/1962 | France | 55/302 |
| 1592023 | 6/1970 | France | 55/523 |

*Primary Examiner*—Robert Spitzer
*Attorney, Agent, or Firm*—Flehr, Hohbach, Test, Albritton & Herbert

[57] ABSTRACT

Disclosed is a hot gas filter system employing ceramic tube filters, or candles, in which the ratio of filter surface to system cross-section can exceed 50. The system includes a pressure vessel having an internal wall dividing the pressure vessel into first and second vessel portions, a gas inlet for directing a hot gaseous stream having particulate matter entrained therein into the first portion and a gas outlet for exhausting a filtered gaseous stream from the second vessel portion, a plurality of gas filter units supported by the internal wall and extending into the first vessel portion. Each filter unit includes a central gas plenum having an outer wall with one end of the outer wall attached to the internal wall, and a plurality of filter modules supported by the central gas plenum. Each module includes a ceramic tube, and support structure extending from the central gas plenum for supporting the ceramic tube and communicating gas between the ceramic tube and the central gas plenum. A backflow of gas is provided through the plurality of gas filter units to the ceramic tubes for periodically dislodging particulate matter from the outer surface of the tubes.

7 Claims, 7 Drawing Sheets

COMPACT CERAMIC TUBE FILTER ARRAY HIGH-TEMPERATURE GAS FILTRATION

BACKGROUND OF THE INVENTION

The invention relates generally to systems for filtering particulate matter from hot gaseous mediums, and more particularly the invention relates to a ceramic tube filter array for high-temperature gas filtration.

The exhaust gases in industrial and utility cogeneration systems and fossil-based power generation plants entrain a large amount of particulate matter. Heretofore, porous ceramic filters have been used to remove the particulate matter from the hot exhaust gases. Such filters take the form of hollow, cylindrical tubes which are positioned in the exhaust system so that gases flow through the cylindrical walls to the center of the tubes and thence through a gas plenum to a clean gas exhaust. The ceramic tubes, or "candles," are periodically cleaned by a reverse flow of gas which dislodges the particulate matter from the outside surfaces of the tubes. The particles fall to a bottom grating from which they are removed from the filter system.

In general, the manufacture of the rigid ceramic filter elements is limited to relatively short lengths due to shrinkage and warpage that can result during the final firing stage of manufacture. The application of these ceramic filter elements in large filter systems requires the packaging of a great number of individual elements to form filter modules. The cost effectiveness and technical viability of the commercial scale, high-temperature ceramic filter system is therefore dependent on developing a compact and technically workable design for mounting and sealing large numbers of individual filter elements.

U.S. Pat. No. 3,436,898 discloses a candle filter in which the filter tubes are arranged in a vertical casing divided by two horizontal partitions into three chambers. The lower chamber is the gas inlet chamber where the hot gases surround and enter the filter elements. In the middle chamber the purified gases leave the filter elements through the perforations in the spacer tubes and are withdrawn. The upper chamber is not entered by the hot gases, and contains springs protected from the heat of the gases for compressing the filter elements. This chamber is accessible from the outside.

U.S. Pat. No. 3,608,282 discloses filter apparatus comprising a first filter positioned within a housing, a closed annulus formed between the housing and the filter, a first conduit in open communication with a first surface of the filter, and closure means positioned in the first conduit. A second conduit is in open communication with a second surface the filter, and closure means is positioned in communication with the first surface of the filter.

SUMMARY OF THE INVENTION

An object of the present invention is a compact ceramic tube filter array having increased filter surface in a containment vessel.

Another object of the invention is means for mounting and sealing a large number of small filter tubes to form a single compact filter module.

Yet another object of the invention is a method for mounting and sealing each filter element to a central gas plenum that minimizes tensile stressing of the ceramic component and improves dust seals.

Another object of the invention is a filter system in which the filter element mount and gas plenum section serves also as the pulsed cleaning manifold having predictable performance and operational characteristics.

Another object of the invention is a filter element mount which eliminates any direct thermal shock to the ceramic elements by means of cold blowback gases.

Still another object of the invention is a ceramic filter tube module which incorporates a passive, fail-safe feature for a failed filter element.

Briefly, the hot gas filter system in accordance with the present invention includes a pressure vessel having an internal wall dividing the pressure vessel into first and second portions, a gas inlet is provided for directing a hot gaseous stream having particulate matter entrained therein into the first portion, and a gas outlet is provided for exhausting a filtered gaseous stream from the second portion. A plurality of gas filter units is supported by the internal wall and extends into the first vessel portion. Each filter unit includes a central gas plenum having an outer wall with means for attaching one end of the outer wall to the internal wall, and a plurality of filter modules supported by the central gas plenum. Each filter module includes a ceramic tube, a support means extending from the central gas plenum and supporting the ceramic tube, with the support means communicating gas between the ceramic tube and the central gas plenum. Means is provided for periodically applying a reverse flow of gas from the central plenum to each of the ceramic tubes for dislodging particulate matter from the outer surfaces of the tubes.

In one embodiment, the support means includes a seat for receiving a flange on one end of the ceramic tube. A clamping ring is bolted to the seat for maintaining the flange in the seat. Spring-biasing means can be applied to the closed end of the tube for urging the flange against the seat, or alternatively weights can be applied at the closed end and at the flange end to maintain the ceramic tube in the seat.

In another embodiment of the invention, a central pulse manifold pipe is inserted in the central gas plenum with the central pulse manifold pipe having a plurality of individual pipes extending therefrom into the support means for transmitting the reverse pulses of air to the tubes for dislodging particulate matter on the outer surfaces. In this embodiment, filtered air flows through the ceramic tube into the support means and through a sintered porous disc to the central gas plenum. Thus, should a ceramic tube become broken or otherwise fail in operation, unfiltered air flowing therethrough will lodge particulate matter in the sintered porous disc which eventually shuts off the flow of air from the defective tube. Thus a fail-safe mechanism can be incorporated in the filter unit so that a defective ceramic tube filter is effectively removed from the system.

The invention and objects and features thereof will be more readily apparent from the following detailed description and appended claims when taken with the drawing.

DETAILED DESCRIPTION OF ILLUSTRATIVE EMBODIMENTS

Figure 1:
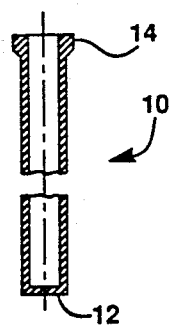
FIG. 1 is a section view of a conventional ceramic filter tube or candle.

FIG. 1 is a section view of a conventional ceramic filter tube, or candle, as employed in high-temperature gas filter arrays. Currently the filter elements are approximately 2.4 inches in diameter and are manufactured to lengths not exceeding five (5) feet. One end 12 of the ceramic tube is closed, and the other end 14 is open and has a flange 16 around the outer surface.

Figure 2:
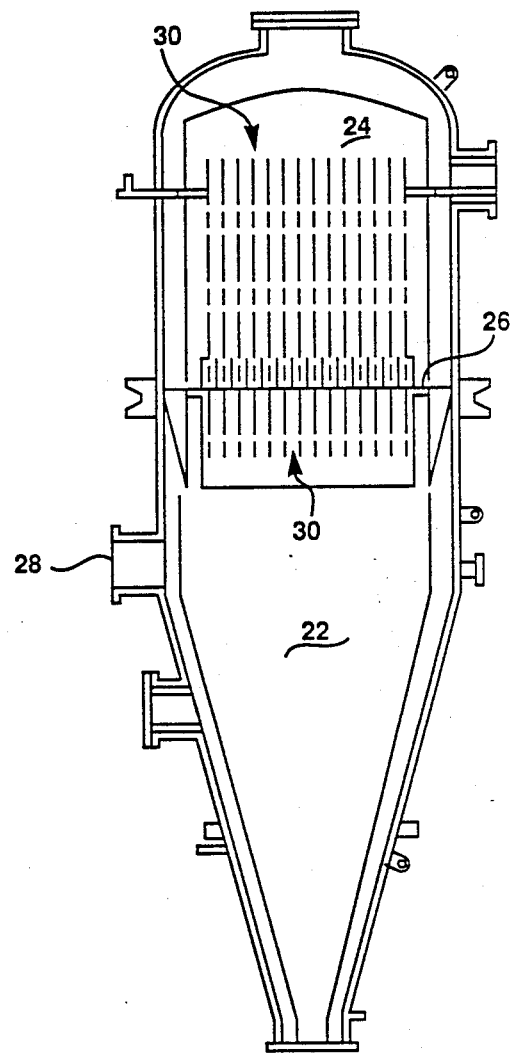
FIG. 2 is a cross-sectional view of a hot gas filter system employing a single-tier candle filter array in accordance with the prior art.

FIG. 2 is a section view of a single-tier ceramic tube filter array in accordance with the prior art. The filter array is provided inside of a pressure vessel 20 having a first portion 22 and a second portion 24 separated by a dividing wall 26. A gas inlet 28 admits hot gases which flow through a plurality of ceramic tubes 30 mounted to the top and bottom surfaces of wall 26. In this arrangement, up to 130 candles or ceramic tubes can be provided in a filter vessel of 8.4 feet in diameter by 29 feet in length. However, the filter surface per square foot of vessel cross-section is only about 7.

Figure 3:
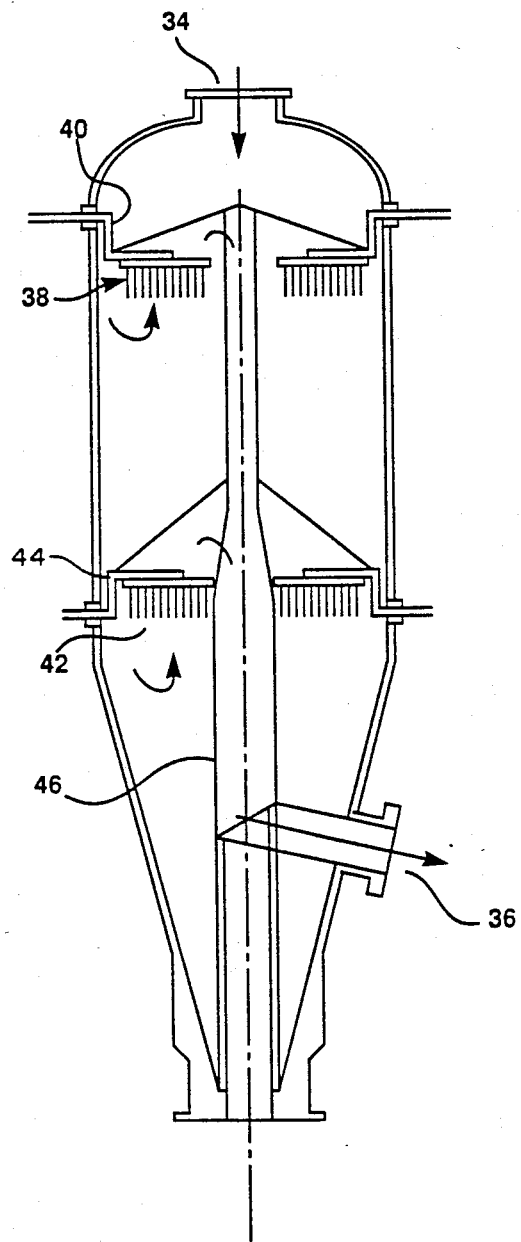
FIG. 3 is a cross-sectional view of a hot gas filter system employing a two-tier candle filter array in accordance with the prior art.

FIG. 3 is a cross-sectional view of another hot gas filter system including a pressure vessel 32 having a gas inlet at 34 and a gas outlet at 36. Two tiers of candle filters are provided including a first tier 38 mounted to brackets 40 and a second tier 42 mounted to brackets 44. Gas flows from the inlet 34 through the two tiers of ceramic tubes into a central gas plenum 46 to the outlet 36. Again, the filter system requires a large-diameter enclosure, and, while additional ceramic tubes are provided for filtering the hot gases, the stacking of the filter arrays complicates the dust-recovery system and filter maintenance.

Figure 4:
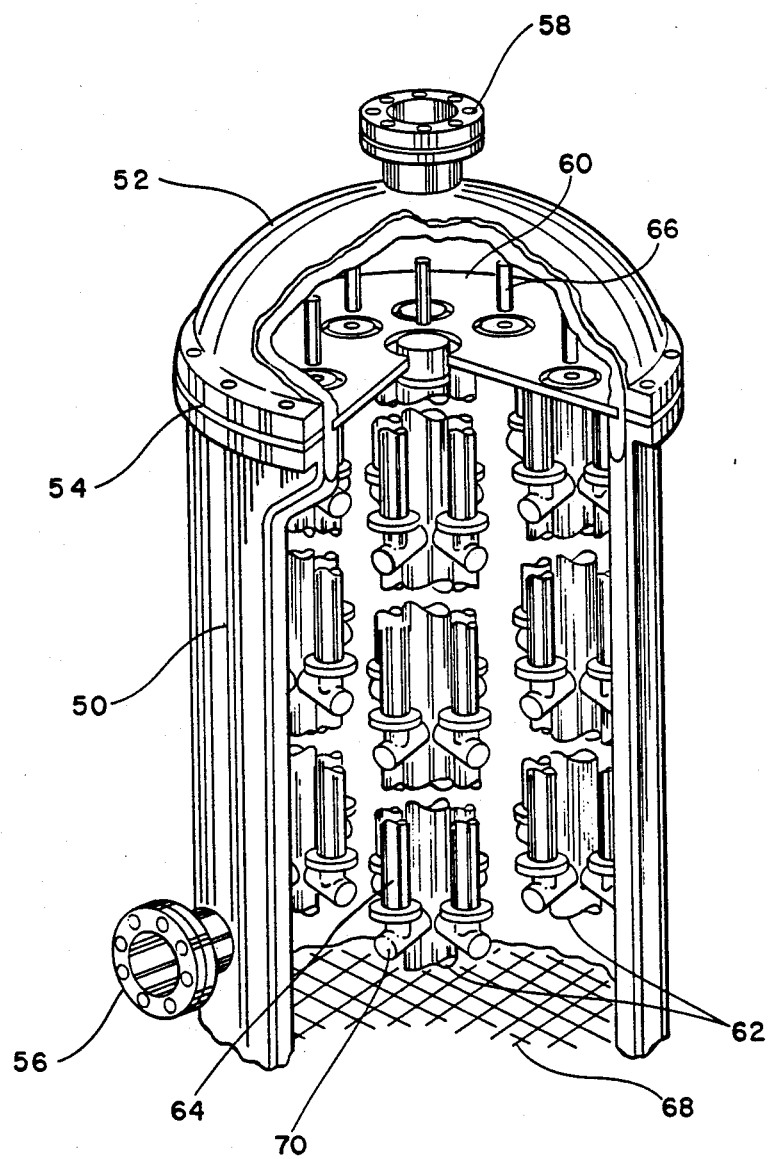
FIG. 4 is a perspective view partly in section of a hot gas filter system in accordance with the invention.

FIG. 4 is a perspective view, partially in section, illustrating a high-temperature gas filter system in accordance with the present invention. Again, a pressure vessel includes a lower cylindrical portion 50 and a top hemispherical portion 52, each having flanges which are joined at 54. A gas inlet 56 is provided to the cylindrical portion of the pressure vessel, and a gas outlet 58 is provided from the hemispherical portion for exhausting filtered air. Joined between the flanges of the portions 50, 52 is a tube sheet 60 which divides the pressure vessel into the first, lower portion and the second, top portion.

Attached to the tube sheet 60 are a plurality of central gas plenums 62. The plenums are attached by bolts or by seal welding. Each central gas plenum 62 supports a plurality of filter modules 64. Because of the use of a plurality of central gas plenums, each accommodating a plurality of sets of filter modules in a stacked array, a greater number of smaller-diameter candles can be employed, thereby increasing the filter surface area per sq. ft. of vessel cross-section to over 50.

Associated with each central gas plenum is a filter module blowback tube 66 for periodically applying pulses of air through the plenum and back through the candles for dislodging particulate matter on the outer surfaces thereof. The particulate matter falls to a collection hopper 68 from which it is removed from the system.

The clean gas plenum section to which the individual candle filters are mounted (FIG. 4) serves to collect the clean (filtered) gas and directs this gas to the central exit section of the assembly. The plenum section, in addition, is designed as a flow manifold to facilitate the pulse-jet cleaning of the individual filters. This is accomplished by putting flow-restricting orifices into the end of each candle mount section 70. When the filter module is cleaned by reverse pulse jet methods, the flow-restricting orifice serves to ensure a uniform distribution of the pulse gas along the plenum section. This permits mounting many candle elements along the plenum section while assuring proper operation. The pulse cleaning gas is delivered to the module by a nozzle that is centered over the discharge end of the clean gas plenum section.

Figure 5:
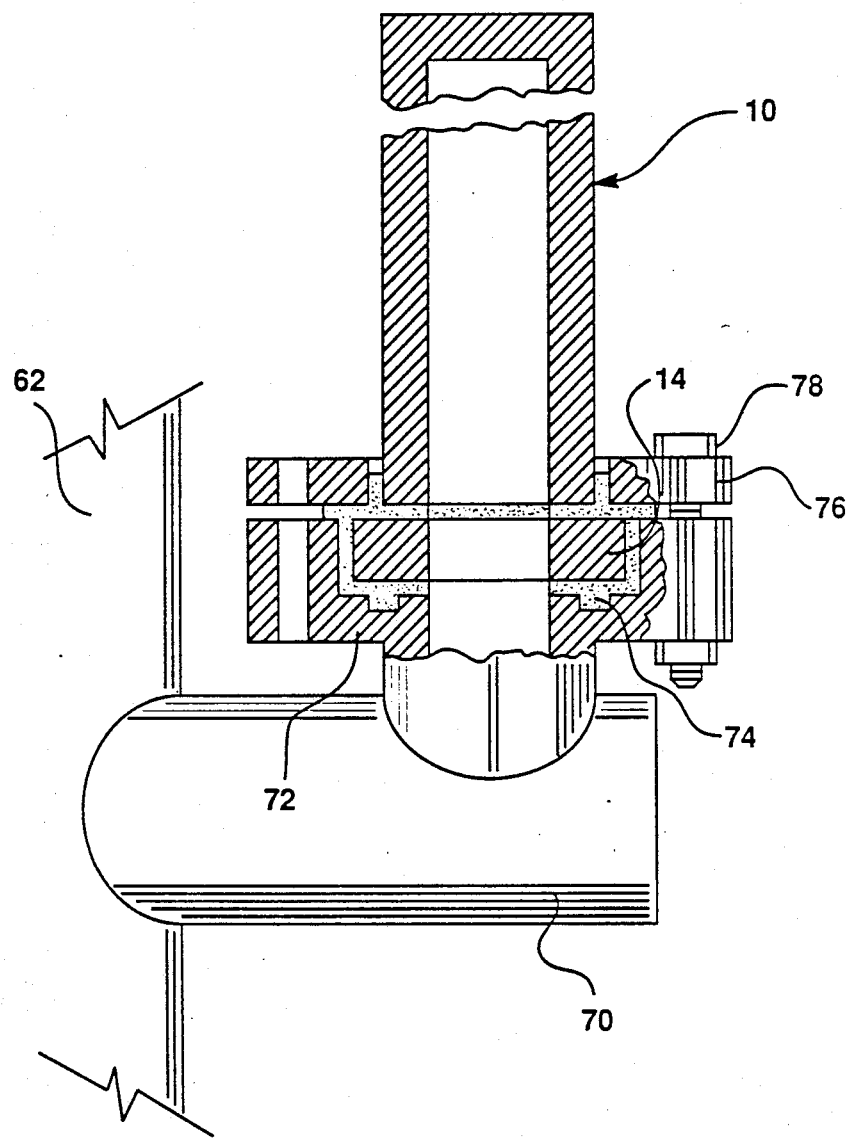
FIG. 5 is a section view illustrating the mounting of the flange portion of a candle in a supporting seat in the filter system of FIG. 4.

FIG. 5 is a section view of a filter module in accordance with one embodiment of the invention. The module includes a support portion including a pipe section 70 extending from the wall of the central gas plenum 62 with a seat 72 extending above the pipe section 70. The flange 14 of candle 10 is supported in seat 72 with an O-ring 74 providing a seal between the flange and the seat. A clamping ring 76 is affixed to the seat by bolt 78 thereby maintaining the ceramic tube and flange in the seat.

Figure 6:
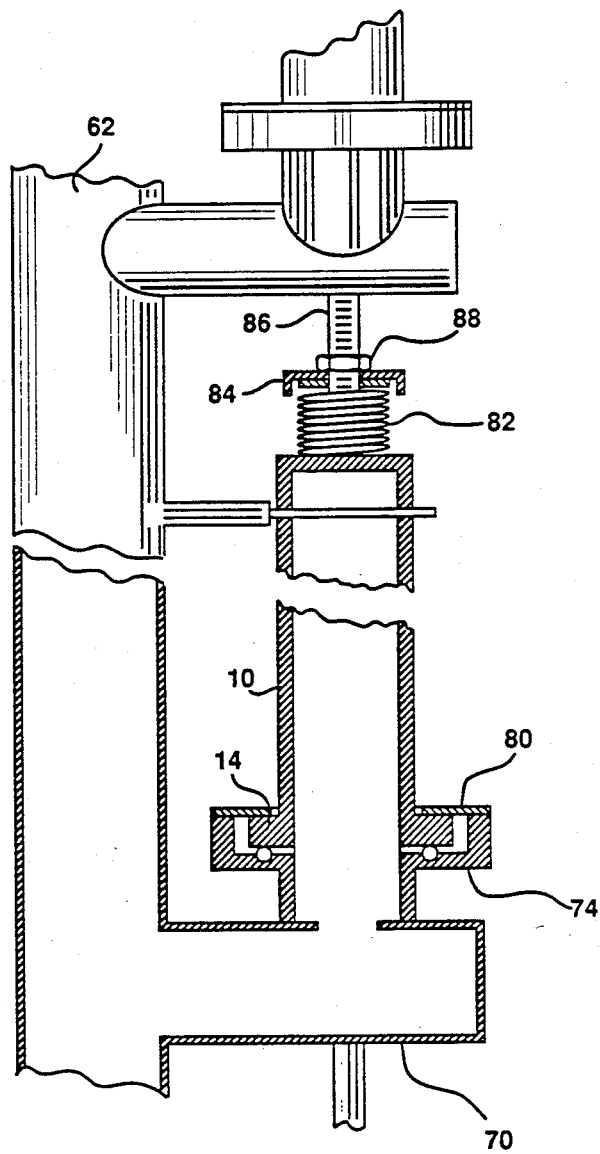
FIG. 6 is a section view illustrating the mounting of a candle in a supporting seat of the filter system of FIG. 4 in accordance with another embodiment.

FIG. 6 is a section view of another embodiment of the mounting means for the ceramic tubes. Again, a pipe section 70 extends from the plenum wall 62 with seat 74 thereon. The flange 14 of tube 10 is loosely fastened in the seat by means of a retainer ring 80, and a ceramic spring 82 yieldably biases the tube 20 in pressure engagement in the seat 74 and accommodates differential thermal growth of the metal and ceramic components during heatup/cooldown cycles. The spring is positioned between the top surface of tube 10 and a centering and pressure plate 84 which is positioned on a threaded post 86 depending from the support of the candle immediately above candle 20. A compression nut 88 threadably engages the post 86 and establishes the pressure of spring 82. The spring provides stress relief when reverse flow of air is transmitted to candle 10 for cleaning purposes.

Figure 7:
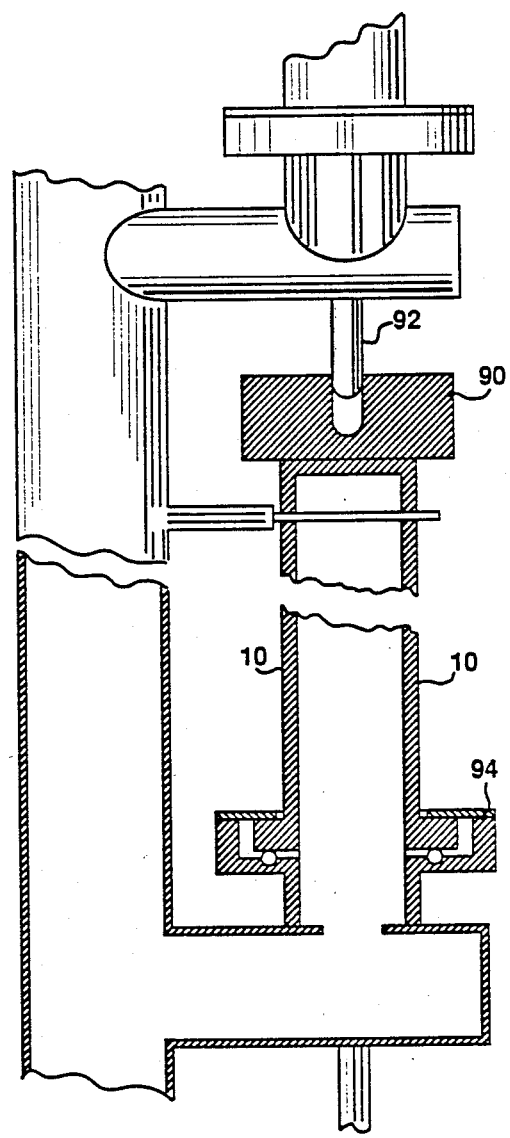
FIG. 7 is a section view illustrating the mounting of a ceramic filter tube in the supporting seat of the filter system of FIG. 4 in accordance with another embodiment of the invention.

FIG. 7 is a section view of another embodiment of the mounting structure for the tube 10 and includes a first weight 90 resting on the enclosed end of tube 10 and maintained in position by means of a post 92 again depending from the mount for the candle immediately above candle 10. Weight 90 preferably has a hemispherical cross-section so that dust dislodged during cleaning falling from the above assembly will slide around the candles positioned underneath. In this way any tendency for dust accumulating on the filter mount assembly is minimized. A second weight 94 can be provided on the flange of candle 10. Thus, appropriate weight (approximately 20 lbs.) is placed either or both on the candle flange section and/or on the closed end of the candle. The weights act by gravity to secure the gasket seal. Weights used around the neck of the candle (flange) are of a donut shape that fits over the candle body. The weighted seal technique is a design that is simple and totally independent of thermal considerations.

Figure 8:
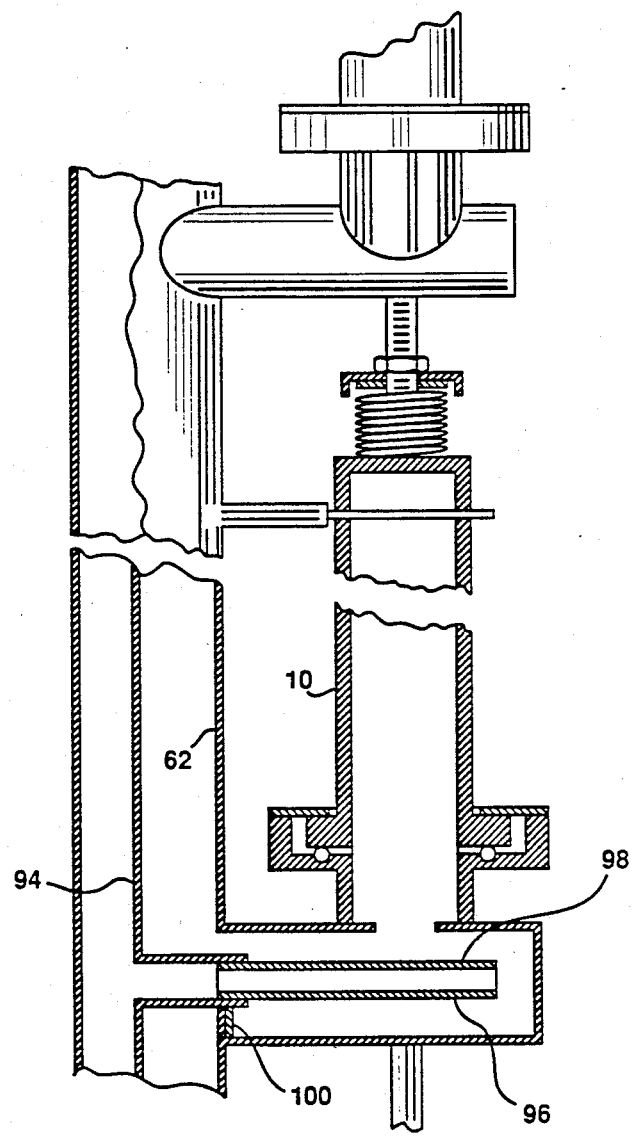
FIG. 8 is a section view of the embodiment of FIG. 6 and further including a fail-safe feature in accordance with another embodiment of the invention.

FIG. 8 is a cross-section view of the embodiment of FIG. 6 and further includes means of providing a candle fail-safe feature. Should one or more of the ceramic tubes break during operation, the flow path from that filter element is passively closed off so that little or no solids escape through the clean gas plenum. This is accomplished by providing a central pulse manifold pipe 94 within the clean gas annular plenum 62 with a pipe extension 96 extending from the manifold pipe 94 to the mount structure with an opening 98 provided in pipe 96 for injecting pulsed air into the ceramic tube 10. The fail-safe feature of this embodiment includes a sintered porous disc 100 through which filtered air from tube 10 must flow to reach the clean-gas annular plenum 62. However, should the tube 10 break or otherwise fail in operation, unfiltered air flows through the candle 10 and through the disc 100 to reach the clean-gas annular plenum 62. The disc 100 becomes clogged and shuts off the flow of uncleaned air passing through the failed candle. Otherwise, during normal operation, the filtered gas passes from the inside of the candle element into the pipe mount section through the sintered porous disc an into the annular region formed by the two coaxial pipes, i.e. the pulse manifold pipe and the clean-gas plenum pipe. The filtered gas passes up through the annular region through the central axis section of the filter unit.

When cleaning the filter module, a surge of high-pressure gas is introduced down into the central pulse manifold pipe. This gas is equally distributed between each of the pulse nozzles that extend from the manifold. The pulse gas in each nozzle is then directed into the internal volume of the individual candle filters, causing a momentary pressure rise and reverse flow that dislodges particulate matter that has previously collected on the outer surface of the candle element.

In the design of the individual filter modules depicted in FIG. 4, each filter element (each candle) is mounted vertically upright to optimize dust seal integrity and minimize mechanical tensile stressing of the ceramic component. Using the vertical upright mounting arrangement allows the force from pressure drop across the filter to seal the filter during normal operation. Unlike the design illustrated in FIG. 2, the dust seal force in the invention actually increases with operating pressure drop. This in principle would eliminate any need for mechanically fixing the individual filters to their mounts. In practice, however, some mechanical fixing of the candle filters is required to maintain their relative position on the mounts and to resist oppositely directed forces that occur during pulse cleaning. Thus, the three alternative methods illustrated in FIGS. 5, 6 and 7 are provided for effecting candle seal and mount.

FIG. 5 illustrates the mounting and sealing of a candle to the central gas plenum section of one filter module that uses a bolted flange assembly. The candle mount assembly consists of a short pipe support section that extends radially from the gas plenum sections and to which a standard pipe flange is welded. The candle filter element sits into the flange and seats and seals against a gasket that is fitted into the shoulder of the flange. In the arrangement shown, an O-ring type seal is used where the O-ring seal is comprised of commercially available ceramic (NEXTEL®) rope material. This rope material has previously been demonstrated to be an effective sealing material for high-temperature service. Other means of accomplishing the seal include ceramic gasketing using INTERAM or fiber blanket. The candle is sealed against the gasket by mechanically bolting the clamping ring to the flange section.

In the embodiment of FIG. 6, a candle mount assembly utilizes a ceramic spring for sealing against pulse cleaning forces. As shown, the basic mounting assembly is identical to that described for FIG. 5 except that a ceramic spring is placed and compressed against the bottom section of the candle. The spring is positioned and centered using a threaded post and nut arrangement that is rigidly attached to the pipe mount section of the above located assembly. The sealing force is applied by turning the nut to compress the spring. The sealing force is determined (controlled) by the deflection of the spring which can be designed to be large compared to any differential thermal growth of metal parts. This assures that a nearly constant load is applied under all metal temperature conditions.

The weighted seal technique represented in FIG. 7 is a design that is simple and totally independent of thermal considerations.

As above described, the ceramic tube filter array for hot gases in accordance with the invention permits a large number of relatively short and small-diameter ceramic filter tubes to form a single compact filter module, thereby increasing the filter surface per square foot of cross-section of the enclosing pressure vessel. Modules are easily mounted and sealed in the containing pressure vessel and minimize tensile stressing of the ceramic component while improving dust seals. The filter element mount and gas plenum can serve as the pulse cleaning manifold whose performance and operational characteristics are completely predictable by established manifold design practice. The design of high-length-to-diameter modules leads to relatively small diameter pressure containment and this reduces stress in the required tube sheet structure and makes the design of such high-temperature components viable and economical. Further, a passive fail-safe feature can be incorporated in the design to shut down any failed filter element.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

I claim:

1. A hot gas filter system comprising
    a pressure vessel including an internal wall dividing said pressure vessel into first and second vessel portions,
    a gas inlet for directing a hot gaseous stream having particulate matter entrained therein into said first portion and a gas outlet for exhausting a filtered gaseous stream from said second vessel portion,
    a plurality of gas filter units supported by said internal wall and extending into said first vessel portion, each filter unit including
        a central gas plenum having an outer wall with one end of said outer wall attached to said internal wall, a plurality of filter modules supported by said central gas plenum, each module including a ceramic tube having one closed end and one open end and a flange around said open end, and support means extending from said central gas plenum for supporting said ceramic tube and communicating gas between said ceramic tube and said central gas plenum, said support means including a seat for receiving said flange, and means for maintaining said flange in said seat including weight means on said closed end of said tube, and means for periodically applying a backflow of gas through said plurality of gas filter units to said ceramic tubes for dislodging particulate matter from the outer surface of said tubes.

2. The hot gas filter system as defined by claim 1 wherein said weight means has a semicircular cross-section whereby particulate matter will not build up thereon during cleaning operations.

3. The hot gas filter system as defined by claim 1 and further including second weight means engaging said flange.

4. A hot gas filter system comprising a pressure vessel including an internal wall dividing said pressure vessel into first and second vessel portions, a gas inlet for directing a hot gaseous stream having particulate matter entrained therein into said first portion and a gas outlet for exhausting a filtered gaseous stream from said second vessel portion, a plurality of gas filter units supported by said internal wall and extending into said first vessel portion, each filter unit including a central gas plenum having an outer wall with one end of said outer wall attached to said internal wall, a plurality of filter modules supported by said central gas plenum, each module including a ceramic tube having one closed end and one open end and a flange around said open end, and support means extending from said central gas plenum for supporting said ceramic tube and communicating gas between said ceramic tube and said central gas plenum, said support means including a seat for receiving said flange, and means for maintaining said flange in said seat, means for periodically applying a backflow of gas through said plurality of gas filter units to said ceramic tubes for dislodging particulate matter from the outer surface of said tubes, said means including a central pulse manifold pipe positioned within said central gas plenum, said central pulse manifold pipe including means extending into said seat for transmitting gas pulses to a ceramic tube mounted on said seat, and a sintered porous filter mounted in the wall of said central gas plenum and within said seat for passing air from a ceramic tube to said central gas plenum.

5. The hot gas filter system as defined by claim 4 wherein said means for maintaining said flange in said seat includes weight means on said closed end of said tube.

6. The hot gas filter system as defined by claim 5 wherein said weight means has a semicircular cross-section whereby particulate matter will not build up thereon during cleaning operations.

7. The hot gas filter system as defined by claim 5 and further including second weight means engaging said flange.

* * * * *